(12) United States Patent
Hayashi et al.

(10) Patent No.: US 9,118,489 B2
(45) Date of Patent: Aug. 25, 2015

(54) COMMUNICATION SYSTEM, NETWORK MANAGEMENT METHOD AND SWITCHING DEVICE

(75) Inventors: Masashi Hayashi, Tokyo (JP); Youichi Hidaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 389 days.

(21) Appl. No.: 13/517,020

(22) PCT Filed: Feb. 23, 2011

(86) PCT No.: PCT/JP2011/001012
§ 371 (c)(1),
(2), (4) Date: Aug. 27, 2012

(87) PCT Pub. No.: WO2011/105065
PCT Pub. Date: Sep. 1, 2011

(65) Prior Publication Data
US 2013/0003574 A1  Jan. 3, 2013

(30) Foreign Application Priority Data

Feb. 24, 2010  (JP) .................................. 2010-038169

(51) Int. Cl.
*H04L 12/12* (2006.01)
*H04L 12/10* (2006.01)
(Continued)

(52) U.S. Cl.
CPC ............... *H04L 12/12* (2013.01); *H04L 12/10* (2013.01); *H04L 12/40013* (2013.01); *H04L 41/0833* (2013.01); *H04L 43/08* (2013.01); *H04L 43/0817* (2013.01); *Y02B 60/34* (2013.01)

(58) Field of Classification Search
CPC ........ G01R 22/00; G01R 22/06; G05B 15/02; H04L 2012/2843; H04L 63/0428
See application file for complete search history.

(56) References Cited

U.S. PATENT DOCUMENTS

| 7,155,623 B2 | 12/2006 | Lefurgy et al. |
| 7,606,151 B2 | 10/2009 | Chilukoor |

(Continued)

FOREIGN PATENT DOCUMENTS

| CN | 1624627 A | 6/2005 |
| CN | 101167373 A | 4/2008 |

(Continued)

OTHER PUBLICATIONS

Chinese Office Action dated May 5, 2014, with English translation.
(Continued)

*Primary Examiner* — Jung Park
(74) *Attorney, Agent, or Firm* — McGinn IP Law Group, PLLC

(57) ABSTRACT

A communication system has: a monitoring unit 201 monitoring power consumption in a switching unit 20 forwarding a communication message; a power consumption data transmission unit 202 transmitting a data indicating the power consumption monitored by the monitoring unit 201; a control signal receiving unit 203 receiving a control signal; a control unit 204 controlling a data transfer rate on the basis of content of control included in the control signal received by the control signal receiving unit 203; a power consumption data receiving unit 301 receiving the data indicating the power consumption transmitted by the power consumption data transmission unit 202; a control determination unit 302 determining, on the basis of the data received by the power consumption data receiving unit 301, target of control and the content of control regarding power consumption; and a control signal transmission unit 303 transmitting the control signal including the target of control and the content of control determined by the control determination unit 302.

20 Claims, 8 Drawing Sheets

(51) Int. Cl.
 *H04L 12/40* (2006.01)
 *H04L 12/24* (2006.01)
 *H04L 12/26* (2006.01)

(56) References Cited

U.S. PATENT DOCUMENTS

| | | |
|---|---|---|
| 7,884,499 B2 | 2/2011 | Cline et al. |
| 2007/0214248 A1* | 9/2007 | Ikeda et al. ................... 709/223 |
| 2008/0141018 A1 | 6/2008 | Tanaka et al. |
| 2009/0322150 A1 | 12/2009 | Cline et al. |
| 2011/0143699 A1* | 6/2011 | Noh et al. ................... 455/127.1 |
| 2013/0102275 A1* | 4/2013 | Morris ........................ 455/405 |

FOREIGN PATENT DOCUMENTS

| | | |
|---|---|---|
| CN | 101252520 A | 8/2008 |
| CN | 101630192 A | 1/2010 |
| JP | 2004-297954 A | 10/2004 |
| JP | 2007-124249 A | 5/2007 |
| JP | 2007-243791 A | 9/2007 |
| JP | 2008-305057 A | 12/2008 |
| JP | 2009-147615 A | 7/2009 |

OTHER PUBLICATIONS

International Search Report in PCT/JP2011/001012 dated Mar. 29, 2011(English Translation Thereof).

"OpenFlow: Enabling Innovation in Cam pus Networks", [online], Nick McKeown et al., [searched on Jul. 17, 2009], Mar. 14, 2008, Internet, <URL:http://www.openflowswitch.org//documents/openflow-wp-latest.pdf>.

* cited by examiner

|  | POWER CONSUMPTION THRESHOLD VALUE | TOTAL POWER CONSUMPTION THRESHOLD VALUE | REQUIRED MINIMUM BANDWIDTH |
|---|---|---|---|
| SWITCH-1 | 50W | | 10Mbps |
| SWITCH-2 | 60W | 150W | 100Mbps |
| SWITCH-3 | 70W | | 500Mbps |

COMMUNICATION SYSTEM, NETWORK MANAGEMENT METHOD AND SWITCHING DEVICE

TECHNICAL FIELD

The present invention relates to a communication system, a network management method and a switching device that can control power consumption.

BACKGROUND ART

In a communication system having a server, a plurality of relay switching devices and a communication line (connecting between the switching device and the server and between the plurality of switching devices), it is desirable that power consumption of the switching device is low. It is also desirable that power consumption of the communication system as a whole is low.

Each switching device operates in an autonomous decentralized manner. That is, each switching device executes route selection processing and the like only on the basis of information retained by itself. Most of the power consumption of the switching device as a whole is power consumed by traffic forwarding processing. Therefore, measures related to the traffic forwarding processing may be taken in order to reduce the power consumption of the switching device.

According to a method (for example, see Patent Literature 1), a switching device being redundant in a certain period is removed from the system, namely, the switching device is powered off during the certain period, thereby reducing the power consumption of the communication system as a whole.

It should be noted that the server in the communication system including the plurality of switching devices is in general a Web server or a file server and does not perform power control of the switching device.

Moreover, as a method of reducing power consumption of an access point device (AP) in a wireless LAN (Local Area Network) system, a method of switching a control state of the AP is known (for example, see Patent Literature 2). According to the method described in Patent Literature 2, after communication in a mode guaranteeing QoS (Quality of Service) of the AP is ended, the AP is shifted to a mode in which the power consumption is reduced although the QoS is deteriorated. That is, when traffic is expected to decrease, data transfer capability of the AP is lowered and thereby the power consumption of the AP is reduced.

It should be noted that a general technique of Open Flow is described in Non Patent Literature 1. The Open Flow is a technique that handles communication as an end-to-end flow and performs route control, fault recovery, load balancing, optimization and the like with respect to each flow.

CITATION LIST

Patent Literature

PLT1: Japanese Patent Application Laid-Open (JP-A) No. 2007-243791
PLT2: JP-A No. 2007-124249

Non Patent Literature

NPL1: "OpenFlow: Enabling Innovation in Cam pus Networks", [online], Nick McKeown et al., [searched on Jul. 17, 2009], Internet, <URL: http://www.openflowswitch.org//documents/openflow-wp-latest.pdf>

SUMMARY OF INVENTION

Technical Problem

According to a network management system described in Patent Literature 1, a method for reducing power consumption of a communication system as a whole is performed in a system having a computer, a plurality of relay switching devices and a communication line connecting the switching devices and the computer. However, according to the system described in Patent Literature 1, control based on power consumption of each of plurality of switching devices is not executed, but just control of powering off one or some switching devices is performed when available transfer speed by the plurality of switching devices and the communication line exceeds data transfer speed between a computer and another computer. That is to say, finely-tuned power consumption control is not executed.

According to the method described in Patent Literature 2, power consumption of a single switching device can be reduced depending on change in a communication environment. However, it is difficult to apply the method to a system having a plurality of switching devices. The reason is that traffic volume of each of the plurality of switching devices is hard to estimate individually because each of the switching devices generally cooperates with another switching device in a communication system having the plurality of relay switching devices.

An object of the present invention is to provide a communication system, a network management method and a switching device that can reduce power consumption of the communication system on the basis of network information of the whole system.

Solution to Problem

A communication system according to the present invention is characterized by including: a monitoring unit monitoring power consumption in a switching unit forwarding a communication message; a power consumption data transmission unit transmitting a data indicating the power consumption monitored by the monitoring unit; a control signal receiving unit receiving a control signal; a control unit controlling a data transfer rate based on content of control included in the control signal received by the control signal receiving unit; a power consumption data receiving unit receiving the data indicating the power consumption and transmitted by the power consumption data transmission unit; a control determination unit determining, on the basis of the data received by the power consumption data receiving unit, target of control and the content of control regarding power consumption; and a control signal transmission unit transmitting the control signal including the target of control and the content of control determined by the control determination unit.

A network management method according to the present invention is characterized by including: monitoring, by a switching device, power consumption; transmitting, by the switching device, a data indicating the monitored power consumption; determining, by a management server, a switching device as a target of control and content of control regarding power consumption, on the basis of the data indicating the power consumption and received from the plurality of switching devices; transmitting, by the management server, a control signal including the content of control to the switching device determined as the target of control; and controlling, by the switching device, a data transfer rate on the basis of the content of control included in the control signal received.

A switching device communicating with a management server through a communication network according to the present invention, the management server determining a switching device as a target of control and content of control regarding power consumption, on the basis of a data indicating power consumption and received from a plurality of switching devices, the switching device characterized by including; a monitoring unit monitoring power consumption; a power consumption data transmission unit transmitting a data indicating the power consumption monitored by the monitoring unit; a control signal receiving unit receiving a control signal including the content of control from the management server; and a control unit controlling a data transfer rate based on the content of control included in the control signal received by the control signal receiving unit.

Advantageous Effects of Invention

According to the present invention, it is possible to reduce power consumption of a communication system on the basis of network information of the whole system.

DESCRIPTION OF EMBODIMENTS

Embodiments of the present invention will be described below with reference to the attached drawings.

First Embodiment

Figure 1:
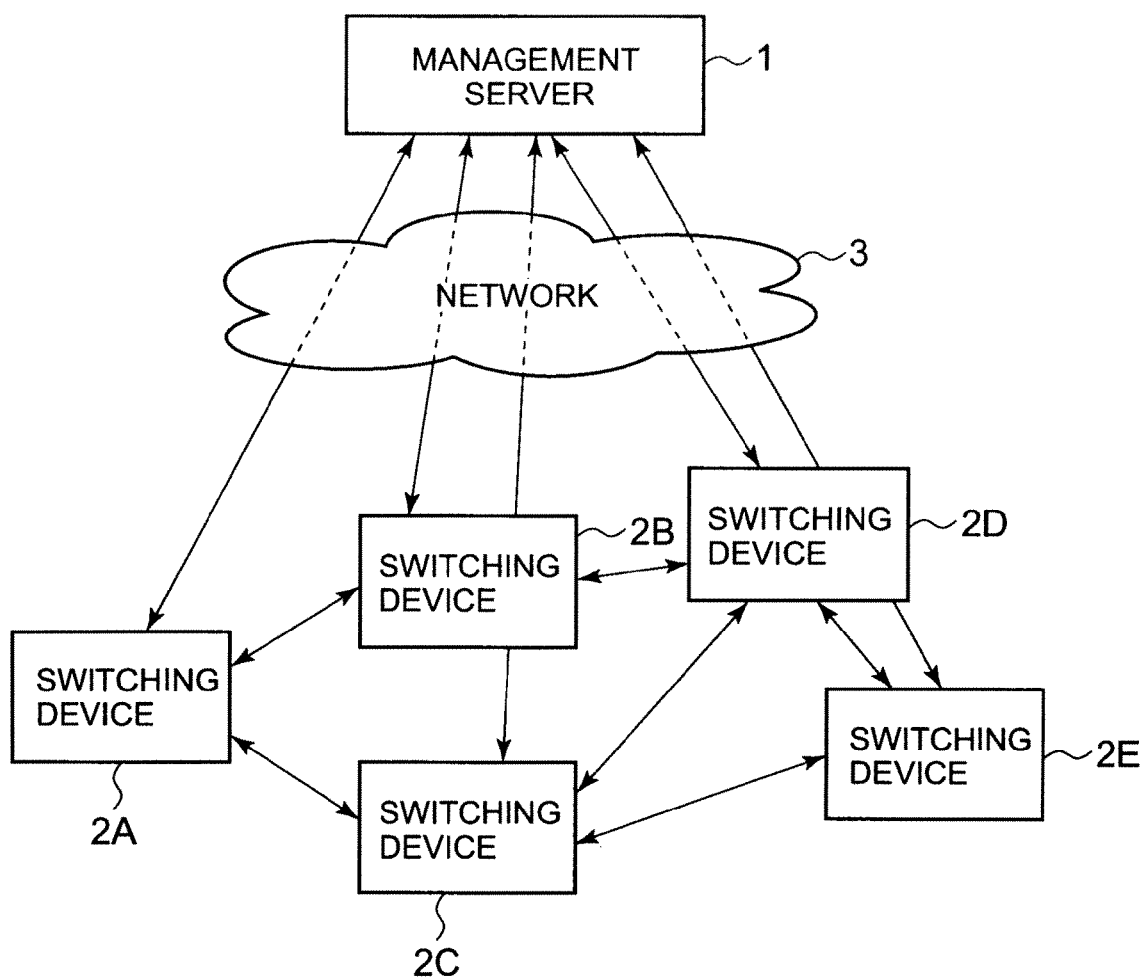
FIG. 1 is a block diagram of an example of a communication system according to the present invention.

FIG. 1 is block diagram of an example of a communication system according to the present invention. The communication system shown in FIG. 1 has a management server 1 managing the whole of the communication system and a plurality of switching devices 2A to 2E (2A, 2B, 2C, 2D, 2E). The switching devices 2A to 2E perform route control and the like for relaying a communication message transferred between a plurality of host devices (not shown). That is, the switching devices 2A to 2E perform switching control of the communication message. All of the switching devices 2A to 2E can communicate with the management server 1 through a network (communication network) 3. It should be noted that although five switching devices 2A to 2E are shown in FIG. 1, the number of switching devices in the communication system is not limited to five.

Each of the switching devices 2A to 2E transmits a data indicating power consumption of itself to the management server 1. The management server 1 integrates the power consumption indicated by the data received from the respective switching devices 2A to 2E and determines, on the basis of the integrated power consumption value, post-control power consumption of each of the switching devices 2A to 2E. Then, the management server 1 transmits a control data indicating the determined power consumption to each of the switching devices 2A to 2E. Each of the switching devices 2A to 2E executes switching control depending on the power consumption indicated by the received control data. That is, each of the switching devices 2A to 2E executes the switching control such that power actually consumed by itself becomes the power consumption indicated by the received control data.

Figure 2:
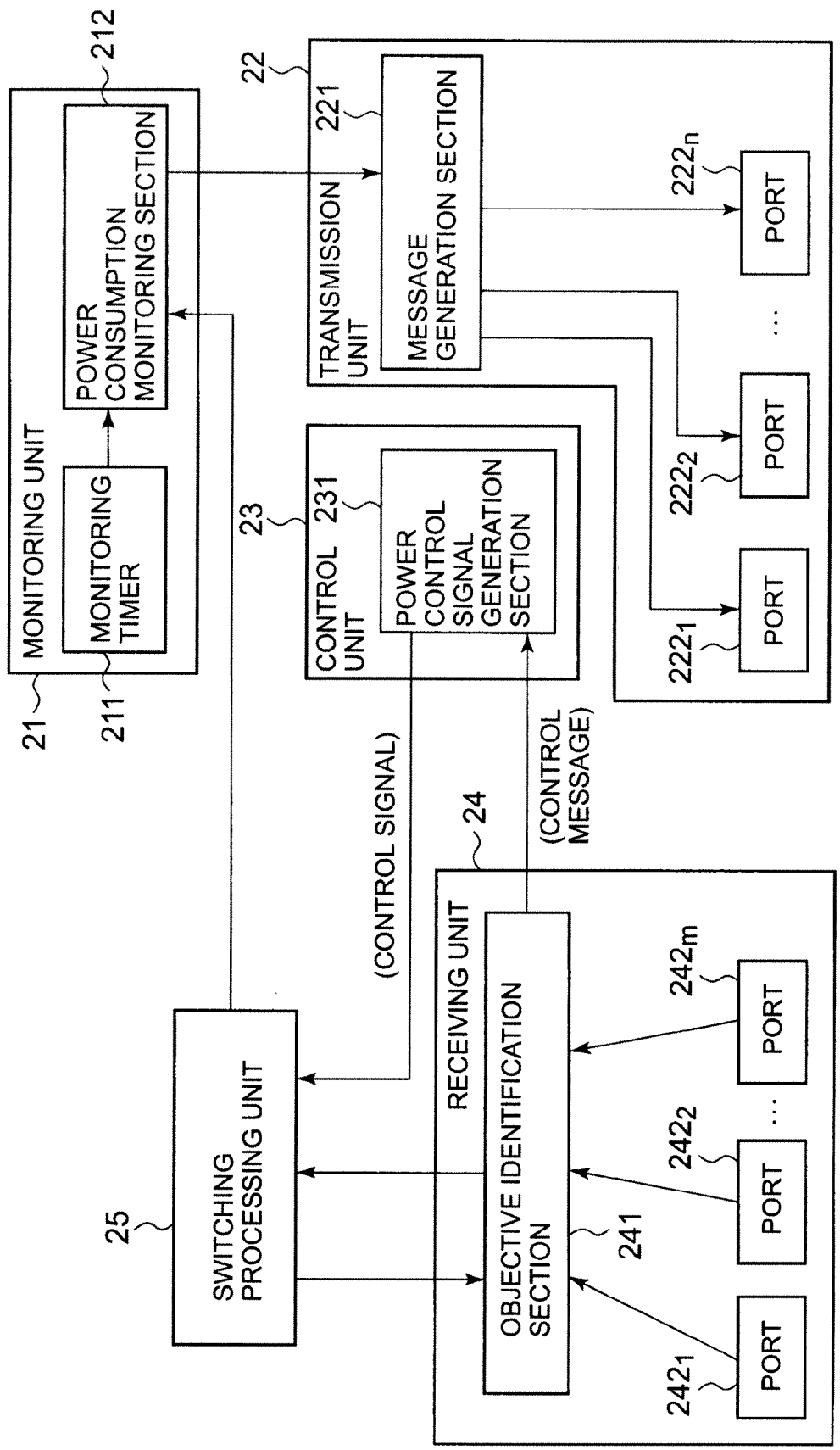
FIG. 2 is a block diagram of a configuration example of a switching device.

FIG. 2 is a block diagram of a configuration example of each of the switching devices 2A to 2E. As shown in FIG. 2, each of the switching devices 2A to 2E has a monitoring unit 21, a transmission unit 22, a control unit 23, a receiving unit 24 and a switching processing unit 25.

The monitoring unit 21 has a monitoring timer 211 that determines timing for measuring of power consumption of the switching device and a power consumption monitoring section 212 that measures the power consumption of the switching device.

The transmission unit 22 has a message generation section 221 that generates a communication message and ports $222_1$, $222_2$, ..., $222_n$ for outputting the communication message.

The control unit 23 has a power control signal generation section 231 that receives a control message from the management server 1 through the receiving unit 24 and outputs a control signal to the switching processing unit 25. It should be noted that the message generation section 221 may be included in the control unit 23.

The receiving unit 24 has ports $242_1$, $242_2$, ..., $242_m$ for receiving a communication message and an objective identification section 241 that identifies a type of the received communication message.

Figure 3:
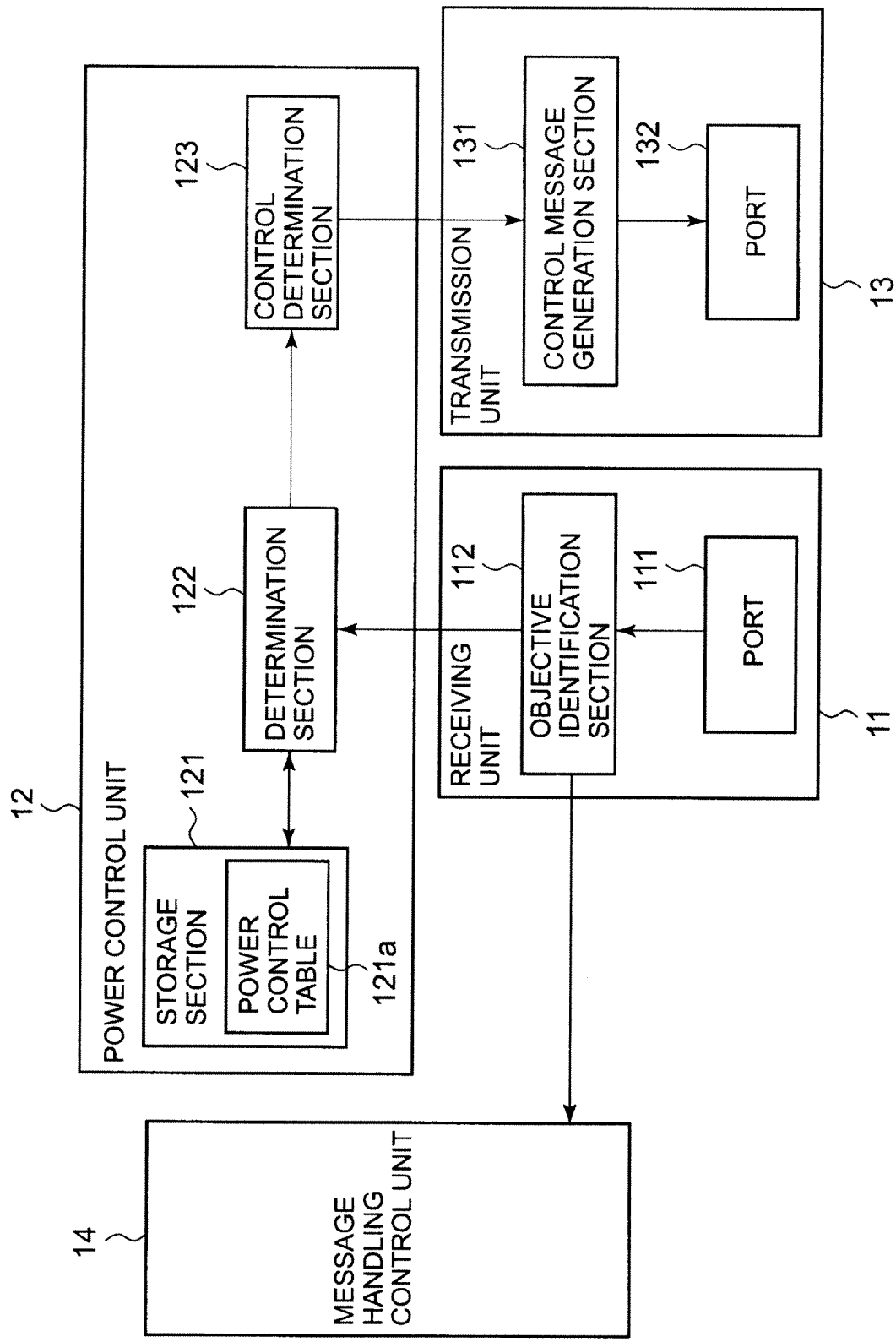
FIG. 3 is a block diagram of a configuration example of a management server.

FIG. 3 is a block diagram of a configuration example of the management server 1. As shown in FIG. 3, the management server 1 has a receiving unit 11, a power control unit 12, a transmission unit 13 and a message handling control unit 14.

The receiving unit 11 has a port 111 and an objective identification section 112 that identifies a communication message input to the port.

The power control unit 12 has a storage section 121 and a determination section 122 that determines whether or not to perform power consumption control on the basis of data set in a power control table 121a stored in the storage section 121 and a result of the identification by the objective identification section 112.

The transmission unit 13 has a control message generation section 131 that generates a control message to be transmitted to the switching devices 2A to 2E and a port 132 for outputting the control message.

Figures 4, 5:
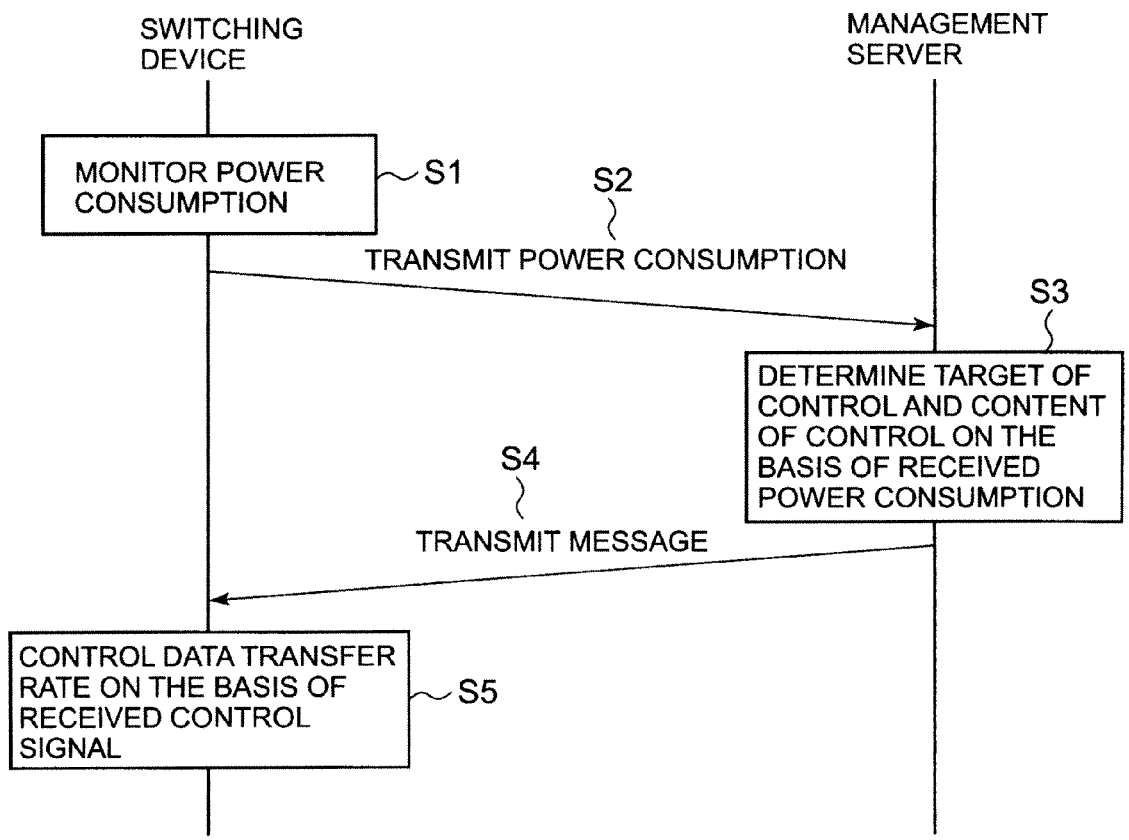
FIG. 4 is an explanatory diagram of an example of data set in a power control table.
FIG. 5 is a flow chart of operations of a switching device and a management server.

FIG. 4 is an explanatory diagram of an example of data set in the power control table 121a. In the example shown in FIG. 4, data indicating a power consumption threshold value for each of the plurality of switching devices (Switch-1, Switch-2 and Switch-3), a total power consumption threshold value being a threshold value of a sum of the power consumption of all the switching devices in the communication system, and a required minimum bandwidth being the minimum bandwidth required for each of the plurality of switching devices are set.

It should be noted that an example in a case where the communication system has three switching devices is shown in FIG. 4 for ease of explanation. For example, Switch-1 corresponds to the switching device 2A shown in FIG. 1, Switch-2 corresponds to the switching device 2B shown in FIG. 1, and Switch-3 corresponds to the switching device 2C shown in FIG. 1.

In the case where the power control table shown in FIG. 4 is used, when the sum of the power consumption of all the switching devices in the communication system exceeds the "total power consumption threshold value", the determination section 122 performs control such that the power consumption of any of the switching devices is lowered under a condition that at least the required minimum bandwidth is maintained.

Moreover, when a switching device exceeds the "power consumption threshold value" set in the power control table 121a, the determination section 122 may perform control such that the power consumption of the switching device is lowered individually. In the following description, not only the power consumption threshold values regarding the Switches-1 to -3 (the switching devices 2A to 2C) as shown in FIG. 4 but also the power consumption threshold values regarding the switching devices 2D and 2E are set in the power control table 121a.

Next, an operation of the switching devices 2A to 2E and an operation of the management server 1 with regard to the power consumption control will be described with reference to a flow chart shown in FIG. 5.

In each of the switching devices 2A to 2E, the monitoring timer 211 periodically outputs a signal to the power consumption monitoring section 212. When receiving the signal from the monitoring timer 211, the power consumption monitoring section 212 measures power consumption of the switching device (Step S1). The power consumption monitoring section 212 may measure the power consumption of the whole of the switching device. Alternatively, the power consumption monitoring section 212 may measure the power consumption of the switching processing unit 25 being a block typically having the highest power consumption in the switching device or measure the power consumption of a specific device (a major device related to the switching processing) in the switching processing unit 25.

The power consumption monitoring section 212 outputs a data indicating the monitored power consumption to the message generation section 221 in the transmission unit 22. The message generation section 221 converts the data indicating the power consumption into a communication message of a predetermined format and then transmits it to the management server 1 through any port of the ports $222_1$ to $222_n$ (Step S2). The communication message including the data indicating the power consumption arrives at the management server 1 through the network 3. It should be noted that the predetermined format includes at least information indicating being a message for the management server 1, the data indicating the power consumption and identification information of the switching device as a source.

In the management server 1, a communication message is received by the objective identification section 112 through the port 111 of the receiving unit 11. The objective identification section 112 determines whether or not the received communication message is a communication message including the data indicating the power consumption. That is, the objective identification section 112 discriminates the communication message including the data indicating the power consumption from other communication messages.

The objective identification section 112 outputs the communication message including the data indicating the power consumption to the determination section 122 in the power control unit 12. In addition, the objective identification section 112 outputs a communication message other than the communication message including the data indicating the power consumption to the message handling control unit 14.

The communication message other than the communication message including the data indicating the power consumption is exemplified by an inquiry message that inquires a route of data transferred between the switching devices. When receiving the communication message that inquires a route of data, the message handling control unit 14 determines the route and performs control for sending a control message indicating the determined route back to a source of the inquiry message.

In the power control unit 12, the determination section 122 determines whether or not to perform the power consumption control, on the basis of the data indicating the power consumption that is included in the input communication message. The following method may be considered as a method of determining whether or not to perform the power consumption control.

For example, the determination section 122 calculates a sum of the power consumption of all the switching devices 2A to 2E on the basis of the data indicating the power consumption that are included in the respective communication messages received from all of the switching devices 2A to 2E in the communication system. In addition, the determination section 122 reads the data of the power control table 121a from the storage section 121. Then, the determination section 122 determines whether or not the calculated sum exceeds the total power consumption threshold value that is set in the power control table 121a. If the calculated sum is determined to be less than the total power consumption threshold value, the determination section 122 determines that there is no need to perform the power consumption control.

If the calculated sum exceeds the total power consumption threshold value, the determination section 122 determines that the power consumption control should be performed. If the determination section 122 determines that the power consumption control should be performed, a control determination section 123 determines, on the basis of a predetermined rule, a target of control and content of control regarding power consumption (Step S3).

The following is considered as an example of the rule. That is, a switching device whose power consumption is the highest among all the switching devices 2A to 2E in the communication system is selected as the target of control. In this case, a switching device having the maximum power consumption value itself may be selected as the switching device whose power consumption is the highest. Alternatively, a switching device having the maximum increase from the power consumption threshold value may be selected.

Instead of the switching device whose power consumption is the highest, the control determination section 123 may select, based on predetermined priority of the respective switching devices, a switching device having the lowest priority as the target of control. The control determination section 123 may select a switching device having the largest number of ports as the target of control. The control determination section 123 may select a switching device having the smallest number of entries as the target of control.

Then, the control determination section 123 calculates reduction amount of the power consumption of the switching device being the target of control in order to make the sum of the power consumption of all the switching devices 2A to 2E in the communication system lower than the total power consumption threshold value. However, in a case where a bandwidth assured by the switching device becomes lower than the required minimum bandwidth if the power consumption is reduced by the reduction amount, the control determination section 123 allocates a part of the reduction amount to the switching device to the extent that the required minimum bandwidth can be assured. Moreover, the control determination section 123 allocates the remaining reduction amount to another switching device (for example, a switching device having the second highest power consumption) in order to make the sum of the power consumption of all the switching devices 2A to 2E in the communication system lower than the total power consumption threshold value. It should be noted in the present example that the reduction amount of the power consumption corresponds to the content of control.

Next, the control determination section 123 outputs a data indicating the determined target of control and content of control to the control message generation section 131 in the transmission unit 13. The control message generation section 131 generates a control message of a predetermined format. The predetermined format includes at least identification information of the switching device as the target of control, the data indicating the power consumption as the content of control and identification information of the management server 1 as a source. Then, the control message generation section 131 transmits the generated control message to the network 3 through the port 132 (Step S4). In the switching device as the target of control, the control message is received by the objective identification section 241 through any of the ports $242_1$, $242_2$, ..., $242_m$.

When receiving a communication message, the objective identification section 241 determines whether or not the communication message is the control message from the management server 1. That is, the objective identification section 241 identifies whether the received communication message is the control message or a communication message communicated between the plurality of host devices.

If the received communication message is determined to be a communication message communicated between the host devices, the objective identification section 241 outputs the communication message to the switching processing unit 25. The switching processing unit 25 performs switching control (route selection and the like) with respect to the communication message.

If the received communication message is determined to be the control message from the management server 1, the objective identification section 241 outputs the communication message, namely the control message, to the power control signal generation section 231 in the control unit 23.

The power control signal generation section 231 generates a control signal depending on the content of control included in the control message and outputs the generated control signal to the switching processing unit 25. The control signal includes information indicating post-reduction bandwidth for achieving the reduction in the power consumption as the content of control. It should be noted that in order to determine the post-reduction bandwidth, the power control signal generation section 231 uses, for example, a table in which a correspondence relationship between data transfer speed (data transfer rate) and power consumption in the switching processing unit 25 is set. In this case, bandwidth, namely a data transfer rate, corresponding to the post-reduction power consumption is read out from the table and the read-out data transfer rate is determined as the post-reduction bandwidth.

It is also possible that the power control signal generation section 231 outputs a control signal indicating the post-reduction power consumption and the switching processing unit 25 determines the post-reduction bandwidth on the basis of the received control signal.

In order to achieve the data transfer rate specified by the control signal, the switching processing unit 25 performs shaping, for example. That is, the switching processing unit 25 temporarily stores a communication message going beyond the data transfer rate specified by the control signal in a buffer memory to postpone control (switching) with respect to the communication message. A substantial data transfer rate is decreased due to the shaping.

It should be noted that the switching processing unit 25 may perform the shaping such that the data transfer rate is decreased to the specified data transfer rate at once. Alternatively, the switching processing unit 25 may gradually increase degree of the shaping such that the data transfer rate becomes the specified data transfer rate.

Instead of decreasing the data transfer rate by the shaping, the substantial data transfer rate in the switching device being the target of control may be decreased by changing a transfer route of communication messages.

Moreover, the data transfer speed itself may be decreased in the switching processing unit 25, in addition to the usage of the shaping. For example, if it is determined that no problem is caused for an internal operation even when a clock frequency of a switch core is decreased by performing the shaping in the switching processing unit 25, a frequency of a data transfer clock signal in a portion performing the switching (switch core) may be decreased. When the switch core has a plurality of CPU cores, the number of operating CPU cores may be decreased.

The control as described above enables the followings. That is, if the sum of the power consumption of the plurality of switching devices in the communication system exceeds a predetermined value (the total power consumption threshold value in the present example), the power consumption of a specified switching device is decreased due to the control by the management server 1 and thereby the sum of the power consumption of the plurality of switching devices can be suppressed to equal to or less than the predetermined value.

It should be noted that the management server 1 transmits a control message for permitting increase in the power consumption to the switching device being the target of control of the power consumption reduction, for example, if a state that the sum of the power consumption of the plurality of switching devices in the communication system is equal to or less than the total power consumption threshold value continues for a predetermined period of time. When receiving such the control message, the switching device that has been the target of control of the power consumption reduction restores the data transfer rate to the original rate.

In the present embodiment, each of the switching devices 2A to 2E uses the monitoring timer 211 to periodically transmit the communication message including the data indicating the power consumption. Instead of such the transmission method, the management server 1 may transmit a request message to each of the switching devices 2A to 2E and each of the switching devices 2A to 2E, when receiving the request message, may transmit the communication message including the data indicating the power consumption.

The data indicating the power consumption and included in the communication message may be an instantaneous value of the power or may be average power amount during a predetermined period of time.

Moreover, each of the switching devices 2A to 2E may transmit statistics information together to the management server 1 when transmitting the communication message including the data indicating the power consumption. For example, the statistics information includes traffic volume toward a specific host device. Furthermore, each of the switching devices 2A to 2E may transmit information and the like indicating predetermined behavior of the switching device, in addition to the statistics information or without transmitting the statistics information.

Moreover, the management server 1 may store the data indicating the power consumption and transmitted from each of the switching devices 2A to 2E as history information in the storage section 121. In this case, the control determination section 123 may determine the target of control on the basis of the history information. Moreover, the history information may be used for improving the communication system. For example, in a case where there is a switching device that frequently transmits the data indicating high power consumption, a new switching device may be installed in order to reduce load imposed on the switching device.

Moreover, the management server 1 may not constantly perform the above-described operation that is for keeping the sum of the power consumption of the plurality of switching devices in the communication system to be equal to or less than the total power consumption threshold value. Instead, the management server 1 may perform the above-described operation only during a predetermined hour. In this case, if each of the switching devices 2A to 2E is configured to periodically transmit the communication message including the data indicating the power consumption, the communication message is ignored in a period other than the predetermined hour. If the management server 1 is configured to transmit the request message requesting the data indicating the power consumption to each of the switching devices 2A to 2E, the management server 1 does not transmit the request message in a period other than the predetermined hour.

It should be noted that each of the switching devices 2A to 2E preferably transmits the communication message to the management server 1 through communication such as SSL (Secure Socket Layer) protocol that can ensure security. However, each of the switching devices 2A to 2E may transmit the communication message through a general IP communication that does not use the SSL protocol and the like.

Furthermore, the communication system described above can be applied not only to WAN (Wide Area Network) based on the Internet or the like but also to LAN based on the Ethernet (registered trademark) or the like.

First Example

Figure 6:
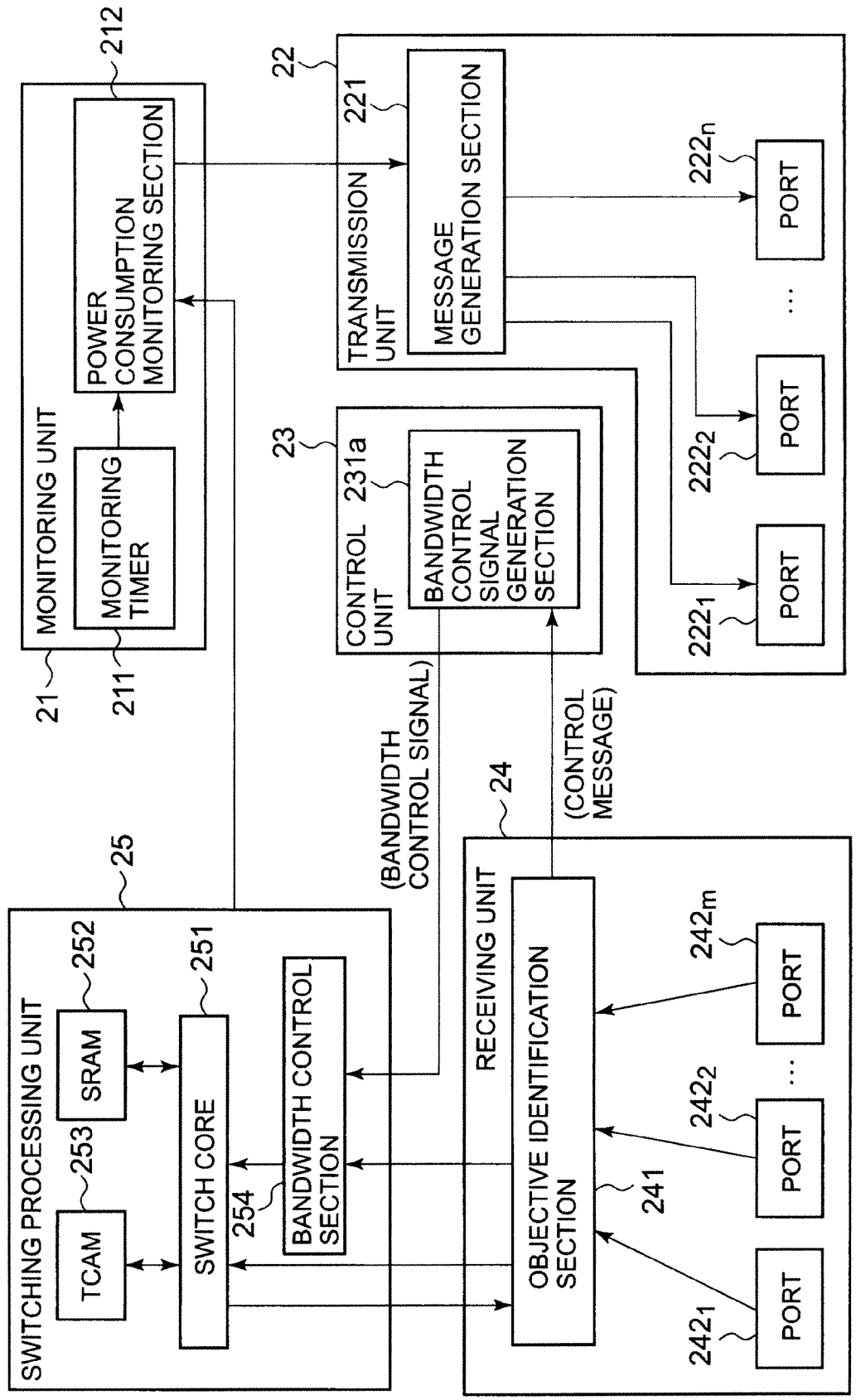
FIG. 6 is a block diagram of a concrete configuration example of a switching device.

Next, a concrete example of a network management system according to the present invention will be described. FIG. 6 is a block diagram of a concrete configuration example of each of the switching devices 2A to 2E. In the example shown in FIG. 6, the switching processing unit 25 has a switch core 251 that performs packet routing processing and the like, an SRAM (Static Random Access Memory) 252 in which a forwarding table is stored, a TCAM (Ternary Content Addressable Memory) 253 as a memory having a function of searching the forwarding table, and a bandwidth control section 254 that controls traffic input to the switch core 251. It should be noted that the bandwidth control section 254 may be a block provided outside of the switching processing unit 25.

In the switching processing unit 25 shown in FIG. 6, the switch core 251 uses the TCAM 253 to fast search the forwarding table stored in the SRAM 252.

In the case of the configuration shown in FIG. 6, the power consumption of the switch core 251 is the target of measuring by the power consumption monitoring section 212. However, the power consumption of the switching device as a whole may be the target of measuring. Alternatively, the power consumption of the TCAM 253 may be the target of measuring.

Moreover, the control unit 23 is provided with a bandwidth control signal generation section 231a that is a concrete example of the power control signal generation section 231.

In each of the switching devices 2A to 2E shown in FIG. 6, the objective identification section 241 identifies whether the received communication message is the control message from the management server 1 or a communication message communicated between the plurality of host devices.

If the received communication message is determined to be a communication message communicated between the host devices, the objective identification section 241 outputs the communication message to the bandwidth control section 254 in the switching processing unit 25. If the received communication message is determined to be the control message from the management server 1, the objective identification section 241 outputs the communication message, namely the control message, to the bandwidth control signal generation section 231a in the control unit 23.

The bandwidth control signal generation section 231a generates a bandwidth control signal depending on the content of control included in the control message and outputs the generated bandwidth control signal to the switching processing unit 25. The bandwidth control signal includes information indicating post-reduction bandwidth for achieving the reduction in the power consumption as the content of control. It should be noted that in order to determine the post-reduction bandwidth, the bandwidth control signal generation section 231a uses, for example, a table in which a correspondence relationship between data transfer speed (data transfer rate) and power consumption in the switch core 251 is set. In this case, bandwidth, namely a data transfer rate, corresponding to the post-reduction power consumption is read out from the table and the read-out data transfer rate is determined as the post-reduction bandwidth.

In order to achieve the data transfer rate specified by the control signal, the bandwidth control section 254 performs shaping, for example. That is, the bandwidth control section 254 performs control by the shaping such that traffic at a rate higher than the specified data transfer rate is prevented from being input to the switch core 251.

It should be noted that the bandwidth control section 254 may decrease the substantial data transfer rate by changing a transfer route of communication messages, instead of decreasing the data transfer rate by the shaping.

Due to the control as described above, the switch core 251 performs the packet forwarding at a bandlimited data transfer rate. Therefore, the power consumption of the switching device is reduced to equal to or less than the power consumption corresponding to the bandlimited data transfer rate.

According to the first example, the traffic input to the switch core 251 is decreased and thus the power consumption of the switch core 251 is reduced. Moreover, the number of searches per unit time by the TCAM 253 is decreased, which also contributes to the reduction of the power consumption.

Second Example

Next, an example where the present invention is applied to the Open Flow will be described. In the case of the Open Flow, an open flow switch (OFS) serving as a forwarding node operates in accordance with a flow table that is added and updated by an open flow controller (OFC: corresponding to the management server 1) in accordance with open flow protocol. A flow entry registered on the flow table includes a pair of a packet matching rule used for identifying a packet and an action such as outputting to a specified port, discarding, rewriting header and the like. If there is a hit entry, the open flow switch performs processing with respect to a received packet in accordance with the action described in the hit entry. If there is no hit entry, the open flow switch notifies an open flow protocol control unit of the packet reception.

Figure 7:
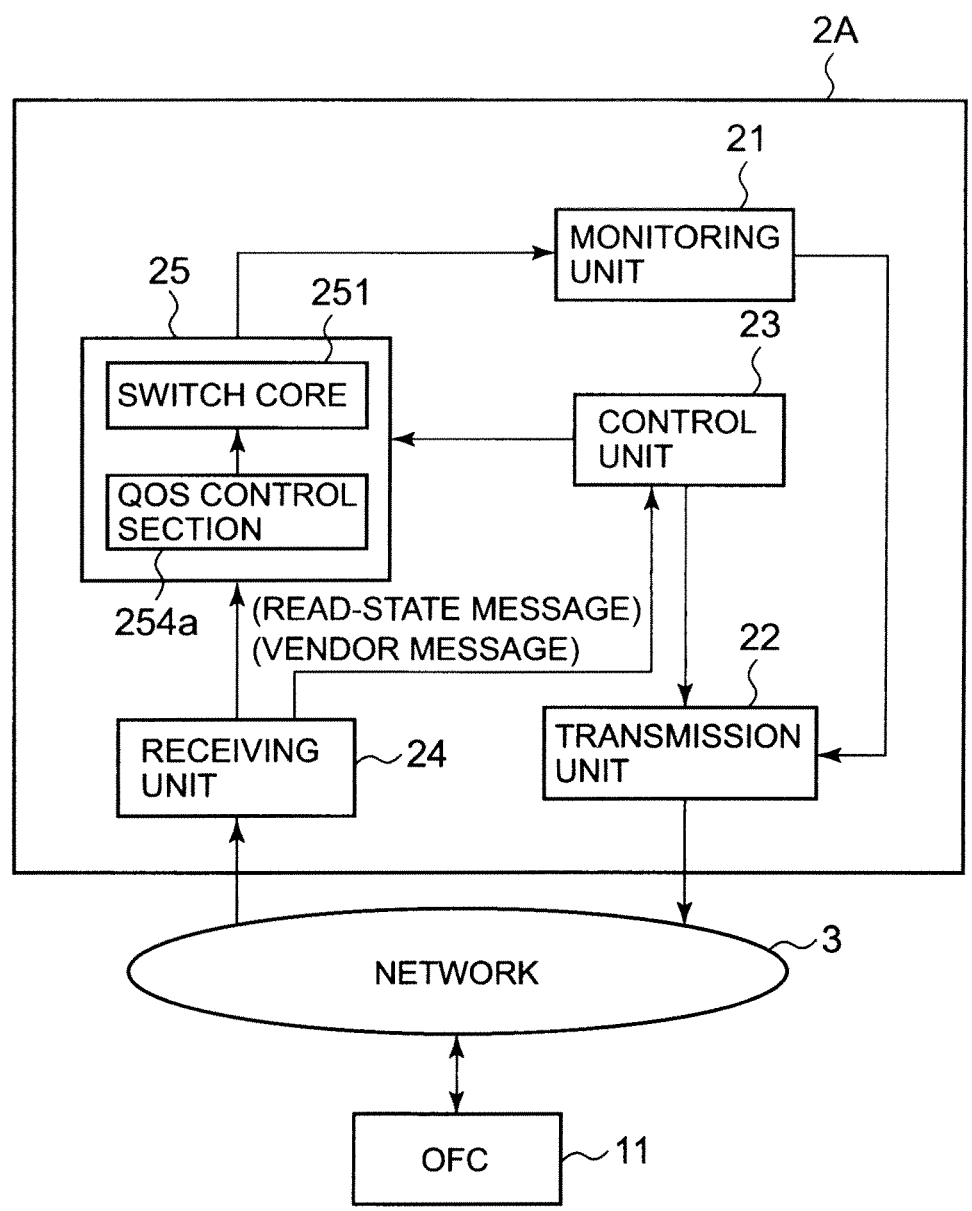
FIG. 7 is a block diagram of a configuration example of a switching device applied to Open Flow.

FIG. 7 is a block diagram of a configuration example of the switching device 2A together with the network 3 and an OFC 11 corresponding to the management server 1, in the case where the present invention is applied to the Open Flow. Although only the switching device 2A is shown in FIG. 7, the other switching devices 2B to 2E also exist in the communication system (see FIG. 1). It should be noted that the switching devices 2A to 2E each is an OFS in the present example.

In the switching devices (OFSs) 2A to 2E, the monitoring unit 21 has the monitoring timer and the power consumption monitoring section as shown in FIG. 2. The monitoring timer periodically outputs a signal to the power consumption monitoring section. When receiving the signal from the monitoring timer, the power consumption monitoring section measures power consumption of the switching device. The power consumption monitoring section may measure the power consumption of the whole of the switching device. Alternatively, the power consumption monitoring section may measure the power consumption of the switching processing unit 25 or measure the power consumption of a specific device (a major device related to the switching processing) in the switching processing unit 25. Then, the power consumption monitoring section outputs a data indicating the monitored power consumption to the transmission unit 22. The transmission unit 22 temporarily stores the data indicating the power consumption. It should be noted that the transmission unit 22 has the message generation section as shown in FIG. 2. Instead, the message generation section may be included in the control unit 23.

When receiving a message regarding the power consumption from the OFC 11, the receiving unit 24 outputs the received message to the control unit 23. The control unit 23 interprets the message received from the receiving unit 24. If the message is a Read-State message, the control unit 23 notifies the transmission unit 22 of reception of the Read-State message. The message generation section in the transmission unit 22 sets the temporarily-stored data indicating the power consumption as power consumption information in flow statistics information (Vendor Statistics) and transmits the flow statistics information to the OFC 11.

In the present example, the power consumption monitoring section periodically measures the power consumption. Instead, the power consumption monitoring section may measure the power consumption when receiving a message regarding the power consumption from the OFC 11. In this case, when a time to collect the power consumption information from each of the switching devices (OFS) 2A to 2E in the communication system has come, the OFC 11 transmits the Read-State message through the SSL to each of the switching devices 2A to 2E.

When receiving the flow statistics information from each of the switching devices (OFS) 2A to 2E, the OFC 11 determines a switching device as the target of control and the content of control as described above (refer to the first embodiment). Then, the OFC 11 transmits a Vendor message in which the content of control is set to the switching device as the target control.

In the OFS, the Vendor message is received by the receiving unit 24. The receiving unit 24 outputs the Vendor message received from the OFC 11 to the control unit 23. The control unit 23 generates a control signal depending on the content of control included in the Vendor message and outputs the generated control signal to the switching processing unit 25, as in the case of the first embodiment. The control signal includes information indicating post-reduction bandwidth for achieving the reduction in the power consumption as the content of control.

In the switching processing unit 25, a QoS control section 254a restricts traffic input to the switch core 251 by the shaping and the like with regard to a specific flow in order to achieve the data transfer rate specified by the control signal.

Figure 8:
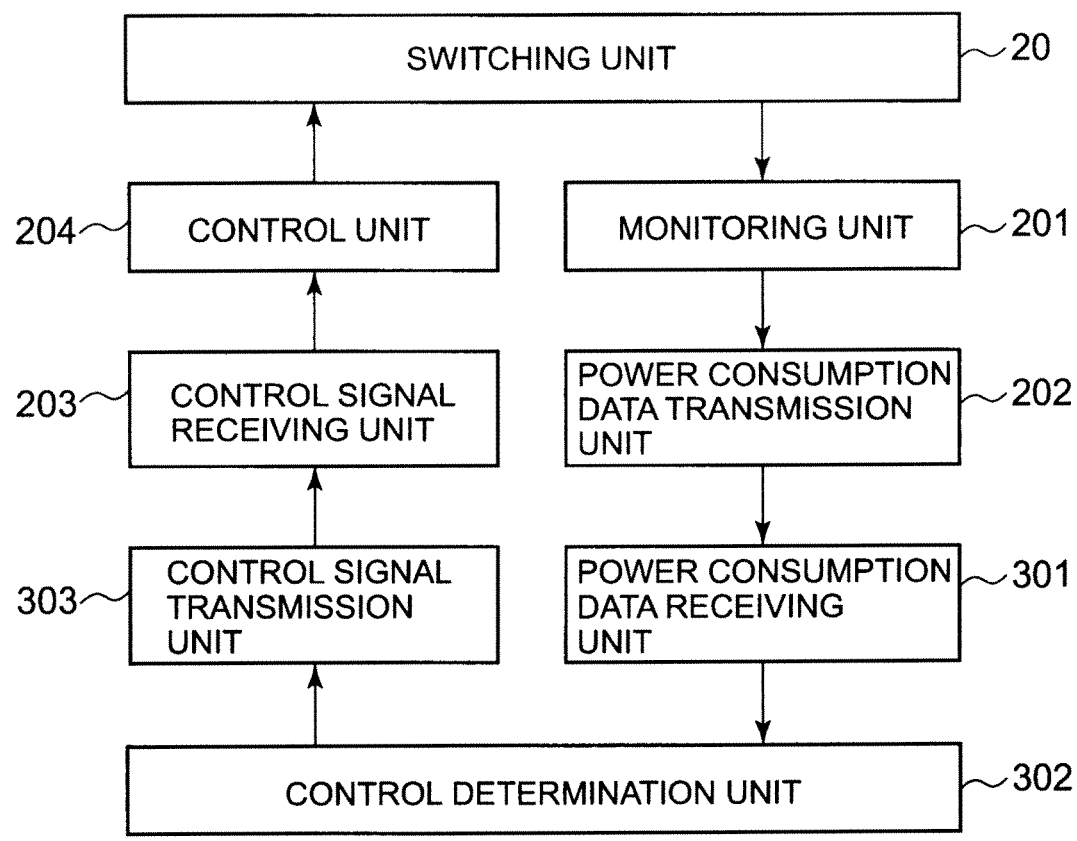
FIG. 8 is a block diagram of a main part of the present invention.

FIG. 8 is a block diagram of a main part of a communication system according to the present invention. As shown in FIG. 8, the communication system has: a monitoring unit 201 (achieved by the monitoring unit 21 in the embodiment) that monitors power consumption in a switching unit 20 (achieved by the switching processing unit 25 or the whole of the switching device in the embodiment) forwarding a communication message; a power consumption data transmission unit 202 (achieved by the transmission unit 22 in the embodiment) that transmits a data indicating the power consumption monitored by the monitoring unit 201; a control signal receiving unit 203 (achieved by the receiving unit 24 in the embodiment) that receives a control signal; a control unit 204 (achieved by the control unit 23 in the embodiment) that controls a data transfer rate on the basis of content of control included in the control signal received by the control signal receiving unit 203; a power consumption data receiving unit 301 (achieved by the receiving unit 11 in the embodiment) that receives the data indicating the power consumption and transmitted by the power consumption data transmission unit 202; a control determination unit 302 (achieved by the control determination section 123 in the embodiment) that determines, on the basis of the data received by the power consumption data receiving unit 301, target of control and the content of control regarding power consumption; and a control signal transmission unit 303 (achieved by the transmission unit 13 in the embodiment) that transmits the control signal including the target of control and the content of control determined by the control determination unit 302.

The following communication systems also are disclosed in the above-described embodiments and examples.

(1) A communication system in which the control unit 204 controls traffic input to the switching unit 20.

Figure 9:
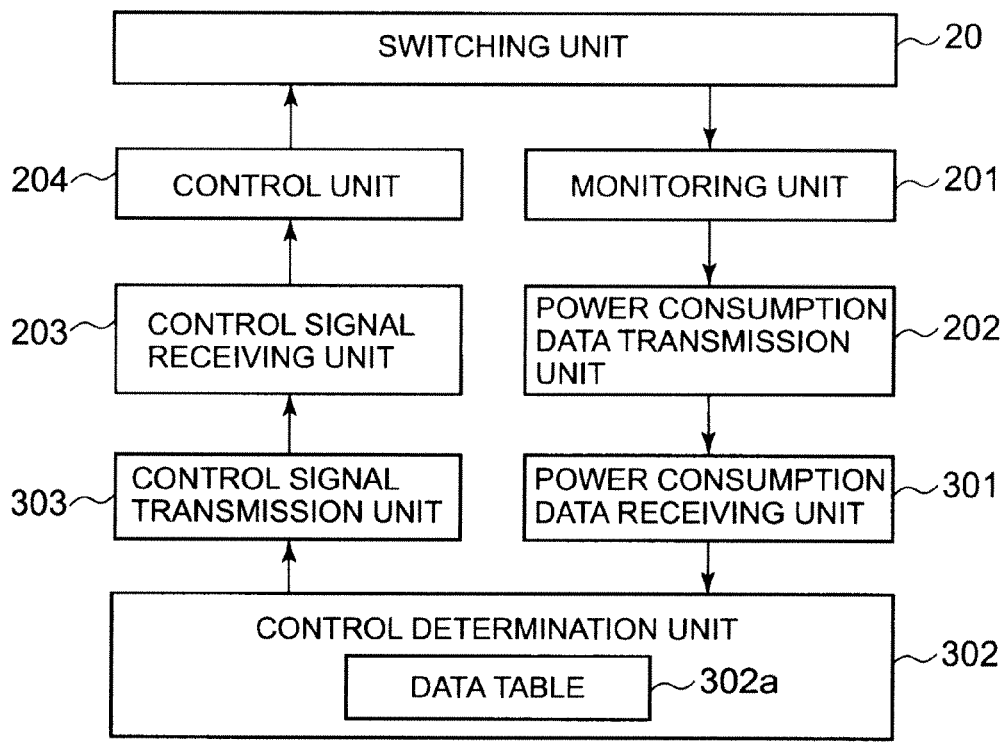
FIG. 9 is a block diagram of a main part of the present invention.

(2) A communication system as shown in FIG. 9 in which the control determination unit 302 has a data table 302a in which a power consumption threshold value for the communication system as a whole is set, and when a sum of the power consumption indicated by the data received by the power consumption data receiving unit 301 from a plurality of power consumption data transmission units 202 exceeds the power consumption threshold value, the control determination unit 302 determines, as the target of control, a switching device that is selected on the basis of a predetermined rule from a plurality of switching devices 2A to 2E each including the switching unit 20.

(3) A communication system in which a data indicating a required minimum bandwidth with respect to each of the switching devices is set in the data table 302a, and the control determination unit 302 determines, as the content of control with respect to the switching device determined as the target of control, a value corresponding to post-reduction power consumption under a condition that at least the required minimum bandwidth is satisfied.

(4) A communication system in which the control determination unit 302 determines the target of control and the content of control during a predetermined hour.

Figure 10:
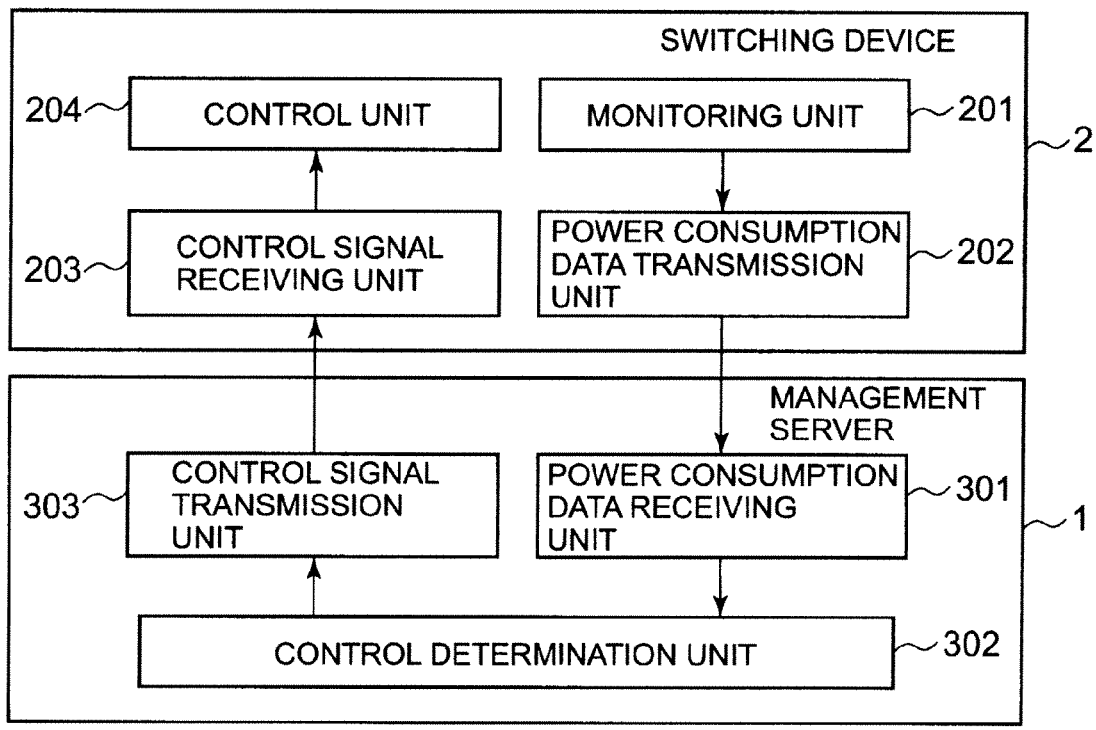
FIG. 10 is a block diagram of a main part of the present invention.

(5) A communication system as shown in FIG. 10 that is provided with a management server 1 having the power consumption data receiving unit 301, the control determination unit 302 and the control signal transmission unit 303 and a switching device 2 having the monitoring unit 201, the power consumption data transmission unit 202, the control signal receiving unit 203 and the control unit 204.

While the present invention has been described above with reference to the embodiments and the examples, the present invention is not limited to the embodiments and the examples described above. The configuration and details of the present invention can be modified as appropriate by those skilled in the art without departing from the scope of the present invention.

This application is based upon and claims the benefit of priority from Japanese patent application No. 2010-038169 filed on Feb. 24, 2010, the disclosure of which is incorporated herein in its entirely by reference.

REFERENCE SIGNS LIST

1 Management server
2, 2A, 2B, 2C, 2D, 2E Switching device
11 Receiving unit
12 Power control unit
13 Transmission unit
14 message handling control unit
20 Switching unit
21 Monitoring unit
22 Transmission unit
23 Control unit
24 Receiving unit
25 Switching processing unit
111 Port
112 Objective identification section
121 Storage section
121a Power control table
122 Determination section
123 Control determination section
131 Control message generation section
132 Port
211 Monitoring timer
212 Power consumption monitoring section
221 Message generation section
$222_1, 222_2, \ldots, 222_n$ Port
231 Power control signal generation section
241 Objective identification section
$242_1, 242_2, \ldots, 242_m$ Port
251 Switch core
252 TCAM
253 SRAM
254 Bandwidth control section
254a QoS control section

The invention claimed is:

1. A communication system, comprising:
   a monitoring unit monitoring a power consumption in a switching unit forwarding a communication message;
   a power consumption data transmission unit transmitting data indicating the power consumption monitored by the monitoring unit;
   a control signal receiving unit receiving a control signal;
   a control unit controlling a data transfer rate on a basis of a content of control included in the control signal received by the control signal receiving unit;
   a power consumption data receiving unit receiving the data indicating the power consumption and transmitted by the power consumption data transmission unit;
   a control determination unit determining, on a basis of the data received by the power consumption data receiving unit, a target of control and the content of control regarding power consumption; and
   a control signal transmission unit transmitting the control signal including the target of control and the content of control determined by the control determination unit.

2. The communication system according to claim 1, wherein the control unit controls a traffic input to the switching unit.

3. The communication system according to claim 2, wherein the control determination unit comprises a data table in which a power consumption threshold value for the communication system as a whole is set, and when a sum of the power consumption indicated by the data received by the power consumption data receiving unit from a plurality of power consumption data transmission units exceeds the power consumption threshold value, the control determination unit determines, as the target of control, a switching device that is selected on a basis of a predetermined rule from a plurality of switching devices each including the switching unit.

4. The communication system according to claim 2, wherein the control determination unit determines the target of control and the content of control during a predetermined hour.

5. The communication system according to claim 2, further comprising a management server performing communication with a plurality of switching devices through a communication network,
   wherein the management server comprises the power consumption data receiving unit, the control determination unit and the control signal transmission unit, and the switching device comprises the monitoring unit, the power consumption data transmission unit, the control signal receiving unit, and the control unit.

6. The communication system according to claim 1, wherein the control determination unit comprises a data table in which a power consumption threshold value for the communication system as a whole is set, and when a sum of the power consumption indicated by the data received by the power consumption data receiving unit from a plurality of power consumption data transmission units exceeds the power consumption threshold value, the control determination unit determines, as the target of control, a switching device that is selected on a basis of a predetermined rule from a plurality of switching devices each including the switching unit.

7. The communication system according to claim 6, wherein a data indicating a required minimum bandwidth with respect to each of the switching devices is set in the data table, and the control determination unit determines, as the content of control with respect to the switching device determined as the target of control, a value corresponding to post-reduction power consumption under a condition that the required minimum bandwidth is satisfied.

8. The communication system according to claim 7, wherein the control determination unit determines the target of control and the content of control during a predetermined hour.

9. The communication system according to claim 7, further comprising a management server performing communication with a plurality of switching devices through a communication network,
wherein the management server comprises the power consumption data receiving unit, the control determination unit and the control signal transmission unit, and the switching device comprises the monitoring unit, the power consumption data transmission unit, the control signal receiving unit, and the control unit.

10. The communication system according to claim 6, wherein the control determination unit determines the target of control and the content of control during a predetermined hour.

11. The communication system according to claim 6, further comprising a management server performing communication with a plurality of switching devices through a communication network,
wherein the management server comprises the power consumption data receiving unit, the control determination unit and the control signal transmission unit, and the switching device comprises the monitoring unit, the power consumption data transmission unit, the control signal receiving unit, and the control unit.

12. The communication system according to claim 1, wherein the control determination unit deter mines the target of control and the content of control during a predetermined hour.

13. The communication system according to claim 12, further comprising a management server performing communication with a plurality of switching devices through a communication network,
wherein the management server comprises the power consumption data receiving unit, the control determination unit and the control signal transmission unit, and the switching device comprises the monitoring unit, the power consumption data transmission unit, the control signal receiving unit, and the control unit.

14. The communication system according to claim 1, further comprising a management server performing communication with a plurality of switching devices through a communication network,
wherein the management server comprises the power consumption data receiving unit, the control determination unit and the control signal transmission unit, and the switching device comprises the monitoring unit, the power consumption data transmission unit, the control signal receiving unit, and the control unit.

15. The communication system according to claim 1, wherein the control determination unit comprises a data table in which a power consumption threshold value for the communication system is set, and
wherein, when a sum of the power consumption indicated by the data received by the power consumption data receiving unit from a plurality of power consumption data transmission units exceeds the power consumption threshold value, the control determination unit determines a switching device as the target of control.

16. The communication system according to claim 1, wherein, when a sum of the power consumption indicated by the data received by the power consumption data receiving unit from a plurality of power consumption data transmission units exceeds a power consumption threshold value for the communication system, the control determination unit determines, as the target of control, a switching device that is selected from a plurality of switching devices each including the switching unit.

17. A network management method executed by a communication system comprising a plurality of switching devices forwarding a communication message, and a management server performing communication with the plurality of switching devices through a communication network, the network management method comprising:
monitoring, by the switching device, a power consumption;
transmitting, by the switching device, data indicating the monitored power consumption;
determining, by the management server, a switching device as a target of control and a content of control regarding power consumption, on a basis of the data indicating the power consumption and received from the plurality of switching devices;
transmitting, by the management server, a control signal including the content of control to the switching device determined as the target of control; and
controlling, by the switching device, a data transfer rate on a basis of the content of control included in the control signal received.

18. The network management method according to claim 17, wherein the switching device controls a traffic input to the switching device on the basis of the content of control included in the control signal received.

19. A switching device communicating with a management server through a communication network, the management server determining a switching device as a target of control and a content of control regarding a power consumption, on a basis of data indicating a power consumption and received from a plurality of switching devices, the switching device comprising;
a monitoring unit monitoring power consumption;
a power consumption data transmission unit transmitting a data indicating the power consumption monitored by the monitoring unit;
a control signal receiving unit receiving a control signal including the content of control from the management server; and
a control unit controlling a data transfer rate on a basis of the content of control included in the control signal received by the control signal receiving unit.

20. The switching device according to claim 19, wherein the control unit controls a traffic input to the switching unit on the basis of the content of control included in the control signal received by the control signal receiving unit.

* * * * *